United States Patent
Williams

(10) Patent No.: US 10,768,979 B2
(45) Date of Patent: Sep. 8, 2020

(54) PEER-TO-PEER DISTRIBUTED COMPUTING SYSTEM FOR HETEROGENEOUS DEVICE TYPES

(71) Applicant: Apple Inc., Cupertino, CA (US)

(72) Inventor: Oliver M. Williams, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 276 days.

(21) Appl. No.: 15/274,748

(22) Filed: Sep. 23, 2016

(65) Prior Publication Data
US 2018/0088986 A1    Mar. 29, 2018

(51) Int. Cl.
*G06F 9/48*    (2006.01)
*G06F 9/50*    (2006.01)
*G06F 9/455*    (2018.01)
*G06F 9/54*    (2006.01)

(52) U.S. Cl.
CPC ........ *G06F 9/4881* (2013.01); *G06F 9/45533* (2013.01); *G06F 9/4856* (2013.01); *G06F 9/5088* (2013.01); *G06F 9/546* (2013.01)

(58) Field of Classification Search
CPC .... G06F 9/4881; G06F 9/5088; G06F 9/4856; G06F 9/45533; G06F 9/546
See application file for complete search history.

(56) References Cited

U.S. PATENT DOCUMENTS

| | | | |
|---|---|---|---|
| 7,395,536 B2 * | 7/2008 | Verbeke | G06F 9/5055 709/200 |
| 8,176,480 B1 * | 5/2012 | Spertus | G06F 8/443 717/127 |
| 9,141,360 B1 | 9/2015 | Chen et al. | |
| 9,270,750 B1 | 2/2016 | Biberman et al. | |
| 9,300,760 B2 | 3/2016 | Sehr et al. | |
| 9,342,557 B2 | 5/2016 | Kornacker et al. | |
| 2004/0098447 A1 | 5/2004 | Verbeke et al. | |

(Continued)

FOREIGN PATENT DOCUMENTS

EP    0767563 A2    4/1997

OTHER PUBLICATIONS

PCT International Search Report for PCT/US2017/051202, dated Sep. 23, 2016, 4 pages.

(Continued)

*Primary Examiner* — Duy Khuong T Nguyen
*Assistant Examiner* — Kevin X Lu
(74) *Attorney, Agent, or Firm* — Womble Bond Dickinson (US) LLP

(57) ABSTRACT

Described is a framework (or technique or method) and system for providing a distributed computing network including different types of devices. The framework allows peer devices to transmit "packages" of information (e.g. messages) throughout the network as conceptual units of a job or data. The framework allows portable code, which is used to perform one or more jobs, to be transportable between peer devices. A device may transmit portable code describing a computation to another device, and the receiving device may then compile the code into executable form that is compatible with the architecture of the particular device. The compiled code may execute functions to perform one or more computations to fulfill job requests as part of a distributed computing protocol.

18 Claims, 11 Drawing Sheets

(56) References Cited

U.S. PATENT DOCUMENTS

| | | | |
|---|---|---|---|
| 2011/0321051 A1* | 12/2011 | Rastogi | G06F 9/4881 |
| | | | 718/102 |
| 2012/0047504 A1* | 2/2012 | Morris | G06F 9/5094 |
| | | | 718/100 |
| 2012/0258664 A1 | 10/2012 | Kinneberg et al. | |
| 2013/0226890 A1* | 8/2013 | Markus | G06F 17/30371 |
| | | | 707/703 |
| 2014/0379853 A1 | 12/2014 | Shelton | |
| 2015/0356294 A1* | 12/2015 | Tan | G06F 8/427 |
| | | | 726/22 |
| 2015/0363294 A1* | 12/2015 | Carback, III | G06F 8/37 |
| | | | 717/132 |
| 2016/0188594 A1* | 6/2016 | Ranganathan | G06F 9/5066 |
| | | | 707/769 |
| 2017/0124322 A1* | 5/2017 | Guilley | G06F 21/54 |

OTHER PUBLICATIONS

PCT Written Opinion of the International Searching Authority for PCT/US2017/051202, dated Sep. 23, 2016, 10 pages.

PCT International Preliminary Report on Patentability for PCT/US2017/051202, dated Apr. 4, 2019, 12 pages.

\* cited by examiner

First-Level Message 500
(e.g. daemon-level message)

| Command 510 | Payload 515 |
|---|---|
| CREATE | bitcode |
| CREATE FAILED | reason code |
| JOIN | worker ID |
| CREATE / JOIN OK | worker ID |
| UNKNOWN WORKER | worker ID |

FIG. 6

Second-Level Message 650
(e.g. worker-level message)

| Command 660 | Payload 665 |
|---|---|
| PUSH | container, data ID |
| FETCH | data ID |
| JOB | input IDs, output IDs, function index |
| DELETE | data ID |
| DESTROY | -- |

FIG. 7

PEER-TO-PEER DISTRIBUTED COMPUTING SYSTEM FOR HETEROGENEOUS DEVICE TYPES

TECHNICAL FIELD

This disclosure relates generally to the field of distributed computing systems. More specifically, this disclosure relates to a framework for providing a distributed computing system within a network of different types of devices.

BACKGROUND

With the advent of an increased number a portable computing devices, the need for integration between various devices has become increasingly important. For example, a user may have access to multiple types of devices at a given time (e.g. smartphone, laptop, etc.), and accordingly, these devices may communicate amongst each other to provide an enhanced user experience. This enhanced user experience may include sharing resources amongst devices in order to increase capabilities such as processing capacity, battery usage, network bandwidth, storage, and the like. Accordingly, these devices may form part of a distributed computing environment. Such computing environments, however, are often burdened with certain requirements in order for devices to share resources. For example, these environments often require a continuity of a communication connection, which often conflicts with the portable nature of many types of modern computing devices. Accordingly, the communication link between devices is often severed, for example, when the device is physically removed from an area (e.g. when a user leaves a location with an accompanying portable device). In addition, portable devices are often reliant on a battery, and accordingly, are often constrained with respect to power consumption. Moreover, with the increase in the number of specialized architectures (e.g. mobile device specific processors and operating systems), it is often the case that devices may not even be able integrate within the distributed environment. Accordingly, traditional distributed computing frameworks are often ill suited for the environments of current user devices.

SUMMARY

Described is a flexible framework (or technique or method) and system for implementing a distributed computing network that may be deployed in environments with various types of devices and configurations. The framework may be used in various contexts to efficiently utilize resources within the environment (e.g. device ecosystem). For example, a device may offload some processing tasks to another device that may have greater capabilities such as processing capacity, storage, power resources, etc. For instance, it may not be uncommon for a user to have a personal device such as a smartphone in proximity to a laptop or desktop computer, either of which may be connected to a continuous power source (e.g. plugged into an electrical outlet). Accordingly, the smartphone may offload processing tasks such as editing multimedia (e.g. photos) to the desktop or laptop computer to utilize a potentially more powerful processor and to conserve battery power. The framework may also implemented to account for one or more devices being removed from the environment (e.g. removed from a local wireless network) by offloading computations to another device. In addition, the framework may be implemented to recognize that a device has rejoined the environment, and accordingly, may resume computations that were suspended. Accordingly, the framework may be utilized in a flexible manner including environments with various types of devices and configurations. Moreover, the framework may be configured to accommodate various networking environments envisioned by a developer.

In one embodiment, described is a framework that leverages portable executable code (e.g. LLVM IR) that may be transported between peer devices to perform jobs within a distributed computing system. In one embodiment, the framework may include a method of performing operations including receiving, using a first-level protocol and by a daemon process on a first device, a first message from a second device. For example, the first message may include portable code which when compiled by the first device provides one or more functions to perform a computation by the first device within a distributed computing system. The operations may also include receiving, using a second-level protocol, a second message from the second device. For example, the second message may include a first job request, wherein the first job request includes an indication of a first function of the one or more functions to perform the computation, and an indication of a required set of input data to perform the first function. In addition, the operations may include in response to the first device obtaining the required set of input data, executing the first function to perform the computation to fulfill the first job request.

Accordingly, the framework may be used in various contexts to efficiently share resources within a distributed environment as further described herein.

BRIEF DESCRIPTION OF THE DRAWINGS

FIG. 6 is a diagram illustrating an example structure for a daemon-level message according an embodiment of the disclosure.

FIG. 7 is a diagram illustrating an example structure for a worker-level message according an embodiment of the disclosure.

DETAILED DESCRIPTION

Figure 1A:
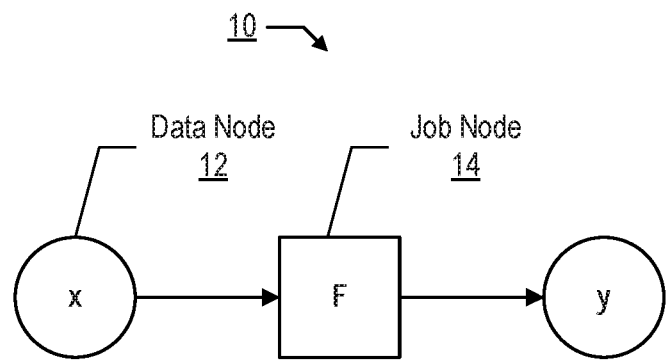
FIGS. 1A-B illustrates an example of graph abstractions for data nodes and job nodes according an embodiment of the disclosure.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments. Reference in the specification to "one embodiment," "an embodiment," or "some embodiments" means that a particular feature, structure, or characteristic described in conjunction with the embodiment can be included in at least one embodiment. The appearances of the phrase "in one/an embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Described herein is a framework (or technique or method) and system for providing a distributed computing network including different types of devices. As further described herein, the framework may allow devices to transmit "packages" of information (e.g. messages) throughout the network as conceptual units of a job or data. For example, a job may include computations to be performed by a device and data may include a set of inputs required to perform the job. The framework provides the ability for jobs to be performed amongst a set of different types of devices as further described herein. To provide such an ability, in some embodiments, the framework allows portable code, which is used to perform one or more jobs, to be transportable between peer devices. For example, a device may transmit portable code to another peer device allowing a job to be performed by the peer device. The receiving device may then compile the code into executable form compatible with the architecture of the particular receiving device, and then perform one or more computations required to fulfill a job request.

As referred to herein, a job may include a computation or an indication of a computation to be performed by a device. For example, the device may perform the computation by executing one or more instructions from a function, process, object, etc. Accordingly, in one embodiment, the job may include a reference (e.g. a pointer) to a function (compiled from the portable code) that executes one or more instructions to provide a set of outputs. As further described herein, data may include any form of information (or data) that may be required to perform a job, or any information (or data) that may be created by a job as output. A representation of the relationship between data and jobs may be shown as an abstract computational graph.

Figure 1B:
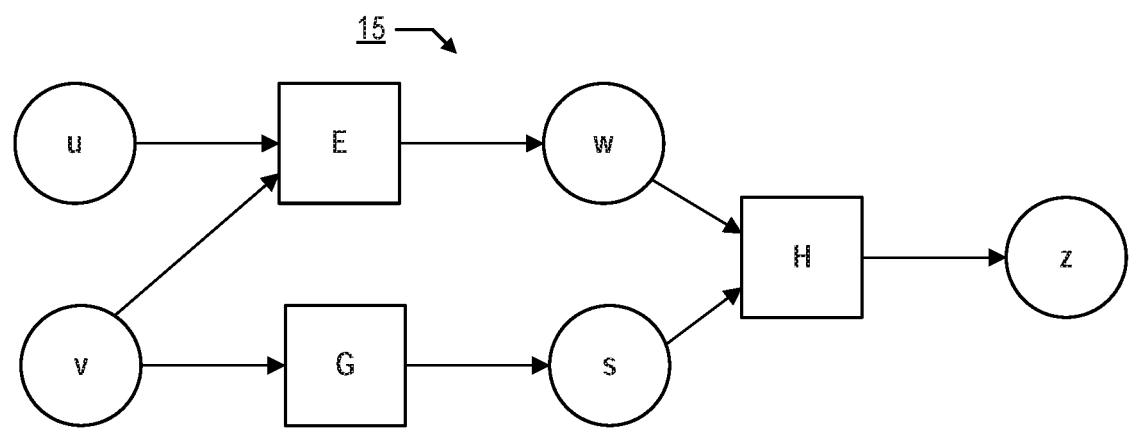

FIGS. 1A and 1B illustrate an example of graph abstractions for data nodes and job nodes according an embodiment of the disclosure. As shown, graphs 10 and 15 may include two types of nodes; a data node 12 (shown as a circular node) and a job node 14 (shown as a square node). A job node 14 may consume zero or more input data nodes to produce one or more output data nodes 12. For example, jobs may represent functions that map data to data (e.g. input data to output data). FIG. 1A illustrates a simple example in which job F is applied to an input x to produce an output y. For example, in a mathematical context, this may be shown as $y=F(x)$. However, the graph may be represented as a directed graph in which data node x is input into job node F to produce the output data y. FIG. 1B illustrates a more complex example. In a mathematical context, this computation may be shown as:

$$w=E(u,v) \quad s=G(v) \quad z=H(w,s)$$

or, when the internal nodes are collapsed as:

$$z=H(E(u,v),G(v))$$

As shown in these examples, the graph is bipartite (e.g. every edge has a job at one end and data at the other end). Accordingly, data nodes may have an in-degree of zero or one (e.g. data is either already in existence, or created as the output of exactly one performed job), and job nodes may have any in-degree. Accordingly, the graph is a directed acyclic graph (DAG), and thus, if the computations within the job nodes are known to complete, the entire computation should run to completion. In other words, the DAG imposes an ordering constraint on jobs. Thus, a job can only be executed once its required set of inputs are available. Moreover, due to the nature of DAGs, an efficient topological ordering may be derived. Based on the derived ordering, a device may determine an efficient sequence for performing one or more jobs.

In some embodiments, the framework allows portable code to be equally transportable as other forms of data within the network of devices. Such an ability may be provided by using one or more messaging protocols (or hierarchy of protocols) as further describe herein. Accordingly, the framework may provide a mechanism to efficiently transport jobs, or data required for the jobs, between devices as necessary. For example, if data required for a particular job is stored on a particular device, the framework allows the job to be sent to that particular device. Similarly, in another example, if a job is stored on a particular device, the required set of data may be provided to that particular device.

It should be noted that in some embodiments, the framework and system described herein may be implemented as a lower-level substrate or platform atop which higher-levels of functionality (e.g. applications) may be implemented. In addition, in some embodiments, the framework may be implemented as a runtime (or runtime library). For example, in one embodiment, the framework may be implemented as a runtime system (e.g. using a C-style programming language) as a particular set of instructions inserted into an executable image by a compiler. As further described herein, the framework may be implemented within a distributed computing system.

Figure 2:
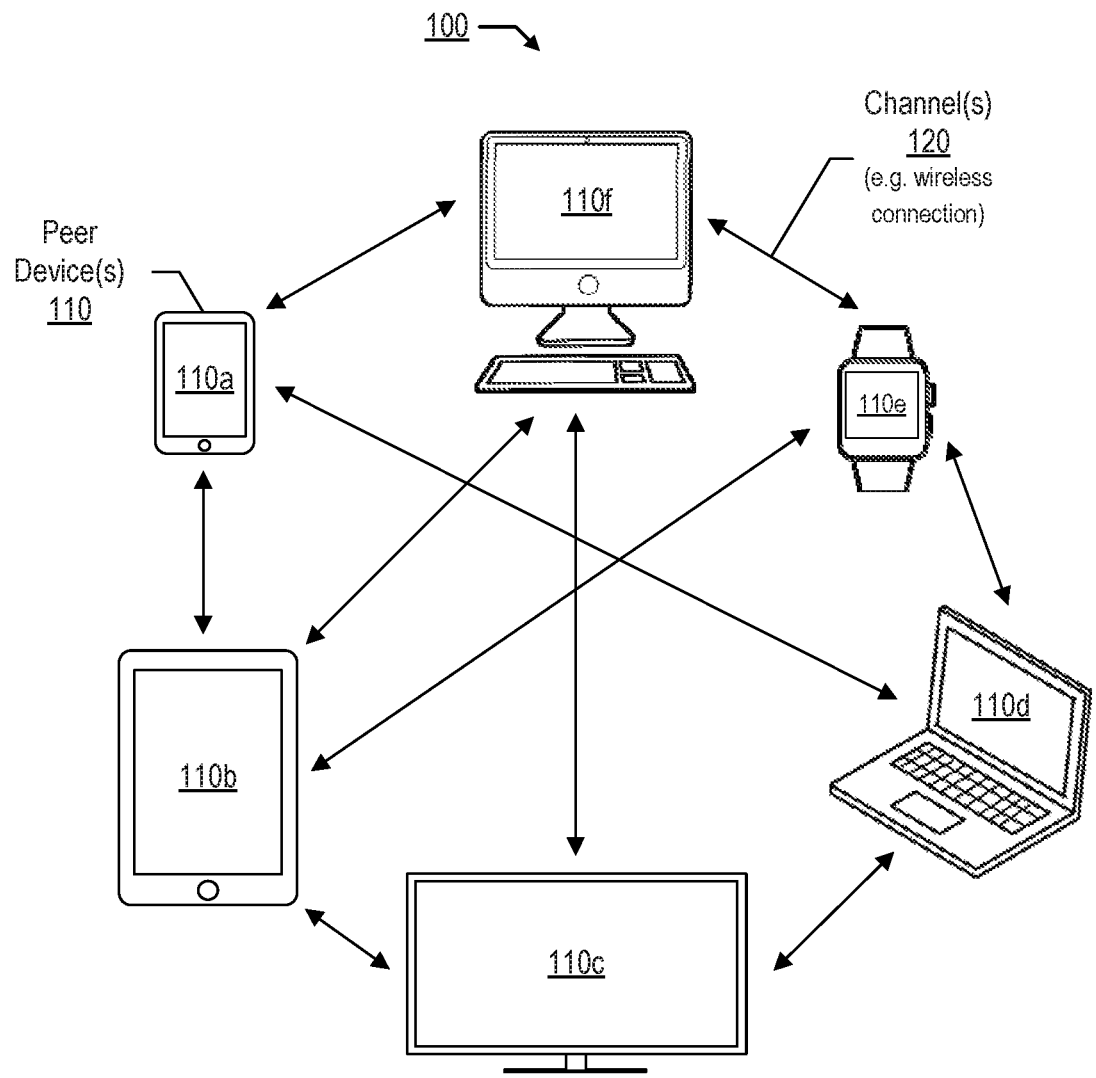
FIG. 2 is a block diagram illustrating an example distributed computing system overview according an embodiment of the disclosure.

FIG. 2 is a block diagram illustrating an example distributed computing system overview according an embodiment of the disclosure. The distributed computing system 100 may include devices 110 (e.g. devices 110a-f), which may be connected via communication channels 120. In one embodiment, the distributed computing system may include a peer-to-peer network of devices. The devices 110 (or peer devices) may be any suitable device and may include various device types. For example, a "type" of device may relate to the category of device which may include, for example, a smartphone (e.g. device 110a), tablet (e.g. device 110b), television (e.g. device 110c), laptop (e.g. device 110d), wearable device such as a smartwatch (e.g. device 110e), desktop (e.g. device 110f), VR headset, set-top-box, or any other type of computing device. A different type of device may also include devices that have different architectures including different operating systems. Different operating systems may include, for example, different variants (e.g. a mobile variant), different versions (e.g. release numbers), or different platforms (e.g. iOS, UNIX, Windows, etc.). Accordingly, as described herein, in some embodiments, the system may be deployed across devices with different operating systems. In another example, a different type of device may also include devices with one or more different components such as a processor, memory capabilities, storage, etc.

The communication channels 120 may include a communication path between two peers along which information may be transferred (or transported). The communication channels 120 may be any wired or wireless communication link between devices 110 including, for example, a physical communication link (e.g. data transfer cable), a network link including any suitable type of wired or wireless network (e.g. WiFi, cellular, etc.) that may be a local area network (LAN), a wide area network (WAN), short range communication link (e.g. Bluetooth), or any combination thereof.

Figure 3:
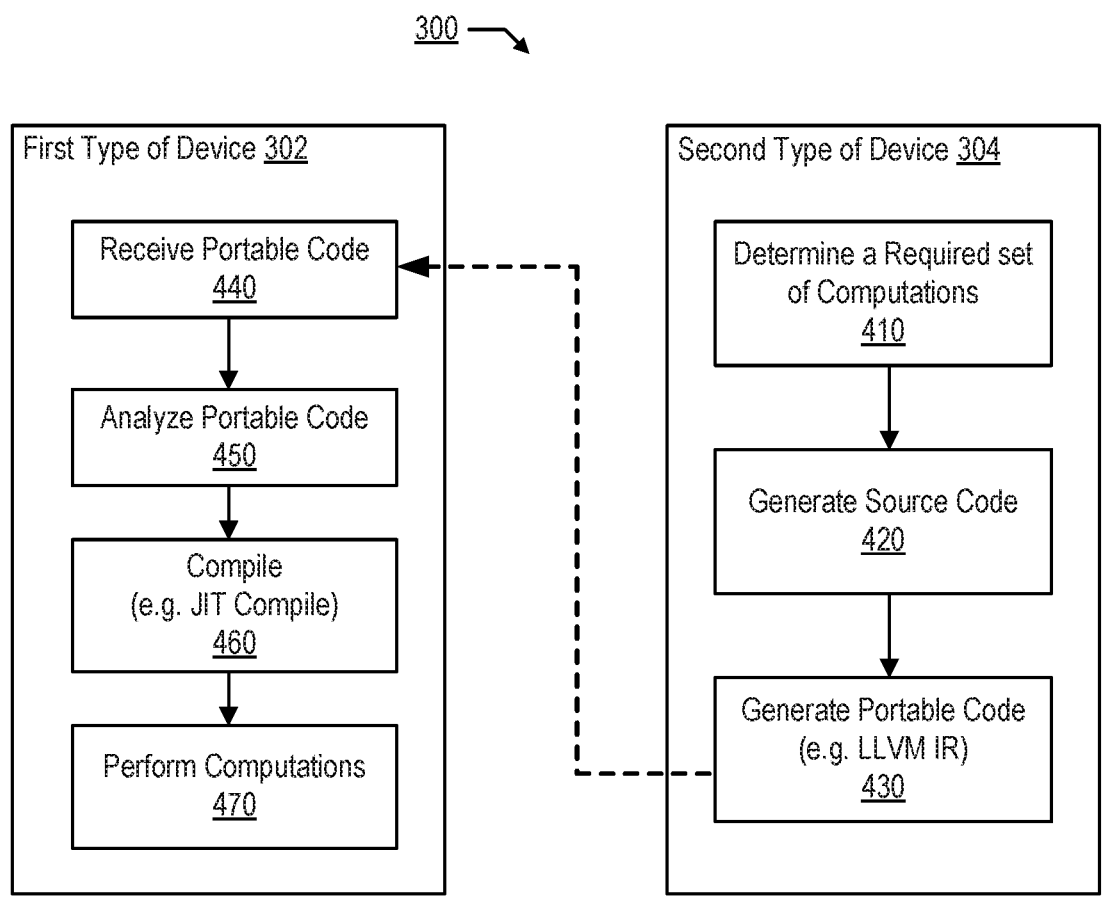
FIG. 3 is a block diagram illustrating an example process flow of providing portable code to a peer device according an embodiment of the disclosure.

FIG. 3 is a block diagram illustrating an example process flow of providing portable code to a peer device according an embodiment of the disclosure. As shown, configuration 300 shows a process flow for providing portable code from a second type of device 304 (or second device 304) to a first type of device 302 (or first device 302). As part of the distributed system, the second device 304 may request one or more jobs be performed by a peer device (e.g. second device 304). The second device 304 may use any suitable policy or set of characteristics when determining which peer devices to select to perform one or more jobs. In one example, a peer device may be selected based on characteristics of the device (e.g. processing power, storage, etc.), a current power source such as a battery source or continuous power source (i.e. plugged into an electrical outlet), proximity of the device (e.g. closest physical device), type of network connection (e.g. transmission bandwidth), currently running applications, or other characteristics. In another example, the second device 304 may be selected based on whether it is associated with a user of the first device 302. For instance, a set of devices may be associated with the same user account (e.g. a user is logged into a particular service on both devices), and accordingly, jobs may be distributed to devices associated with the same user.

As part of the process flow, the second device 304 may determine a required set of computations 410 for one or more jobs. For example, these computations may provide the required output to fulfill a job request. Accordingly, the second device 304 may generate source code 420, for example, that includes instructions or commands (e.g. functions) to perform the determined computations. The second device 304 may generate the source code using a language native to the second device 304. In order to allow different types of devices to perform jobs as described herein, the second device 304 may generate portable code 430 from the source code. The portable code may be any suitable code that may be complied by a peer device in the network. In one embodiment, the portable code may be implemented using LLVM (Low Level Virtual Machine) technologies that may include a collection of modular and reusable compiler and toolchain technologies. For example, in one embodiment, implementations may use an LLVM IR (intermediate representation) as portable code. For example, the second device 304 may generate machine-independent intermediate code (e.g. LLVM IR) from its source code and that intermediate code may be compiled by the first device 302 to its native machine code. In addition, implementations may use LLVM bitcode (or bytecode) that may include creating a bitstream container format and encoding the LLVM IR into the container format. For example, the bitstream may include an encoding of data structured in a format as further described herein. By its design, LLVM implementations are language-agnostic, and thus, may be used in conjunction with any suitable programming language. For example, implementations may use various front-end languages with compilers that use LLVM (e.g. Common Lisp, Delphi, Fortran, OpenGL, Haskell, Java bytecode, Julia, Objective-C, Python, Ruby, Swift, etc.). Accordingly, the decoupling of the source language from the target architecture of the receiving peer device, allows jobs to be performed on different types of devices as described above.

Once the portable code is generated, it may be sent (by request or retrieval) to the first device 302 (e.g. another peer device). As described above, the first device 302 may be different (e.g. uses a different operating system) than the second device 304. In some embodiments, the portable code may be sent as a message using one or more protocols (e.g. first-level protocol 350 as described further herein). It should be noted that with a traditional remote procedure call (RPC) configuration, a device must typically already have any code required to execute a remote procedure. In contrast, with configuration 400 as shown, a first device 302 may only require the ability to receive (and compile) the portable code 440 to perform a job. For example, in some embodiments, to receive the portable code, the first device 302 may only require that it is executing a particular process (e.g. daemon 310 as described further herein). For example, the process may receive, and dynamically link, the portable code.

Once the portable code is received, the first device 302 may analyze the portable code 450. Due to the nature of the received data being executable, the first device 302 may analyze the portable code for security (e.g. malware, viruses, authorized access to resources, untrusted source, etc.). In one embodiment, analyzing the portable code 450 may include a check of control flow integrity of the code. For example, a check of control flow integrity may include preventing a wide variety of unauthorized access by analyzing to code to ensure that it does not redirect the flow of execution of a job in a manner not permitted by the device. In addition, when analyzing the portable code 450, the first device 302 may employ various verification techniques depending on the trust relationship between the devices. For example, the analysis may include verifying certificates, signatures, or employing various encryption schemes in order to ensure that the portable code is safe to execute. In one embodiment, the system may also use variants or dialects of the portable code that implement have built-in restrictive policies such as their own "sandboxing" techniques as further described herein. In addition, in some embodiments, the system may use a higher level domain specific language (DSL) which may be potentially more restrictive and more efficiently analyzed by the receiving device.

Once the code is analyzed and deemed safe, the system may compile 460 the code. In one embodiment, the second device 304 may compile the portable code in response to being deemed safe to allow one or more computations to be performed upon receiving a job request. When compiling code, the second device 304 may compile of all or just a portion of the code. In one embodiment, the second device 304 may JIT (just-in-time) compile all or a portion of the portable code. For example, the second device 304 may JIT compile only the necessary portion of the portable code to perform the required computations in response to receiving a job request.

Once the portable code is compiled, the first device 302 may perform computations 470 to fulfill a job request. For example, computations may be performed on behalf on the second device 304 as part the distributed computing system. In one embodiment, the compiled code may provide one or more functions to perform a computation that outputs data. As further described herein, the outputted data may then be used for other jobs to be performed on other peer devices as part of the distributed computing system.

Figure 4:
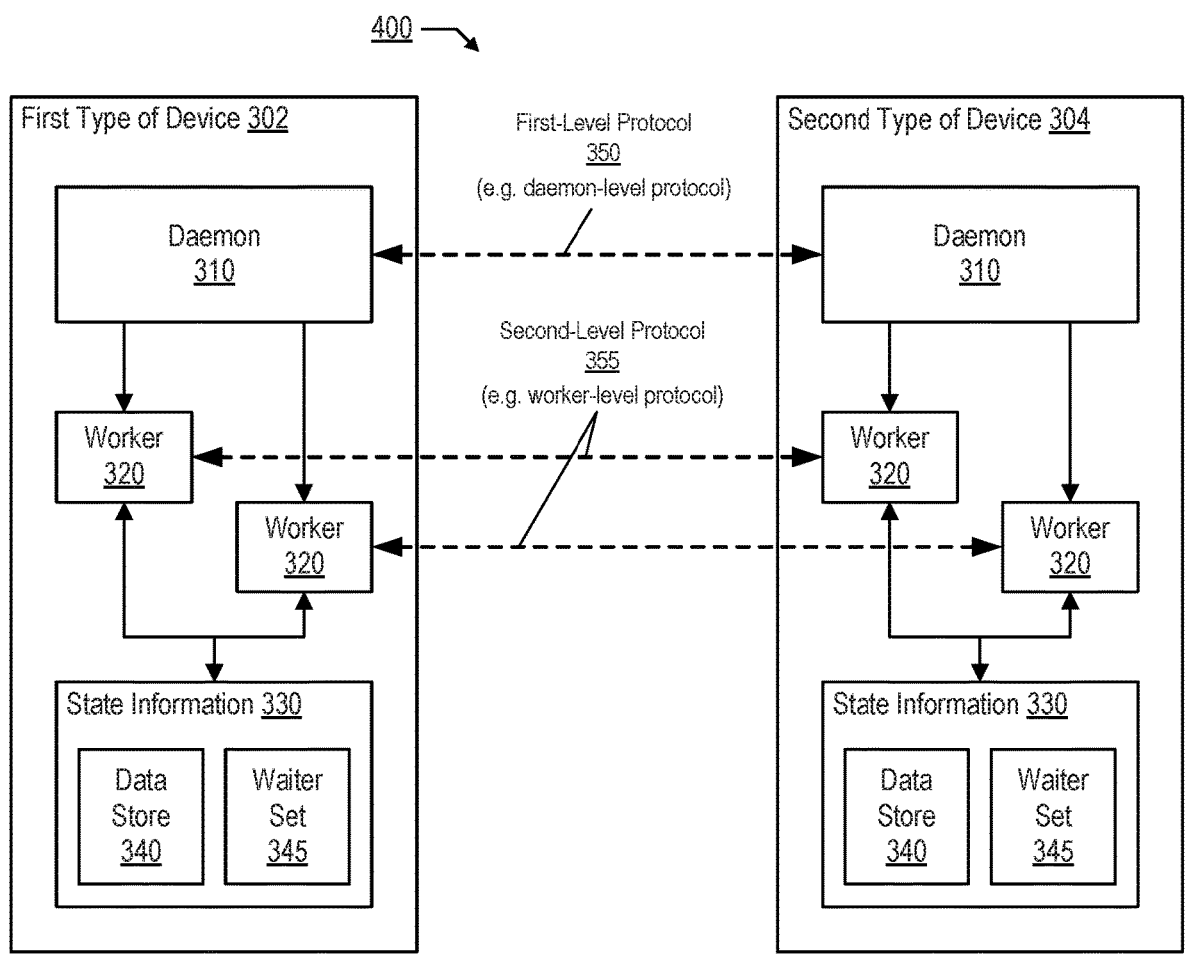
FIG. 4 is a block diagram illustrating an example configuration of peer devices according an embodiment of the disclosure.

FIG. 4 is a block diagram illustrating an example configuration of peer devices according an embodiment of the disclosure. As described, the configuration 400 may include multiple cooperating devices (or peers). As shown, the configuration 400 may include a first type of device 302 (first device 302) and a second type of device 304 (second device 304) as shown in FIG. 3. In one embodiment, the first device 302 may be a different type of device than the second device 304 as described above. In one embodiment, the framework may include a hierarchy of components. In one embodiment, framework may include a first-level (e.g. top-level) daemon 310. As referred to herein a daemon 310 may include a process (or module, program, application, object, component etc.) that may run a process (e.g. background process) on the device on which the daemon 310 resides (or host device).

In one embodiment, the daemon 310 may manage network connections (e.g. via communication channel 120) between a first type of device 302 and a second type of device 304. The daemon 310 may manage the network connection by communicating with another daemon 310 hosted on a second type of device 304. In one embodiment, the devices may communicate with each other to create an access connection using a first-level protocol 350 (or daemon-level protocol). In one embodiment, a device may host a single access connection per physical device, and in turn, the device may host multiple devices with multiple access connections.

In one embodiment, after an access connection to a device has been granted by the daemon 310 (e.g. device 302 granted access to device 304, or vice versa), a respective demon 310 may create a worker 320 (or an instance of a worker 320) on the respective host device. As referred to herein, a worker 320 may include a process (or module, program, application, object, component etc.) to manage data and perform jobs and further described herein. In some embodiments, the worker 320 may be implemented as a sub-process or sub-module of the daemon 310. In one embodiment, a worker 320 may communicate with others workers 320 created on other devices using a second-level protocol 355 (e.g. worker-level protocol). Accordingly, the worker 320 (or daemon 310) may coordinate operations of its respective device (e.g. host device) including storing and managing data, scheduling the execution of jobs, and other operations as necessary. In one embodiment, a device may "sandbox" its respective workers 320 to provide an additional layer of security. For example, "sandboxing" may include compartmentalizing resources (e.g. data, memory addresses, processes, features, etc.) that a worker 320 is allowed to access on its respective host device. In one embodiment, the "sandboxing" may be administered by the daemon 310. In one embodiment, a worker 320 may be associated with state information 330, which may include a data store 340 and a waiter set 345. Workers 320 may share state information 330 with other workers, or each worker may be associated with its own instance of the state information 330.

It should be noted that embodiments may have different configurations then the configuration described above to manage access connections and to manage communications between devices. For example, in one embodiment, the daemon process 310 may also directly manage communications between devices (e.g. communications handled by a worker 320 as described above). In addition, other processes, sub-processes, applications, objects, etc. may also be utilized to implement the framework as described herein.

Figure 5:
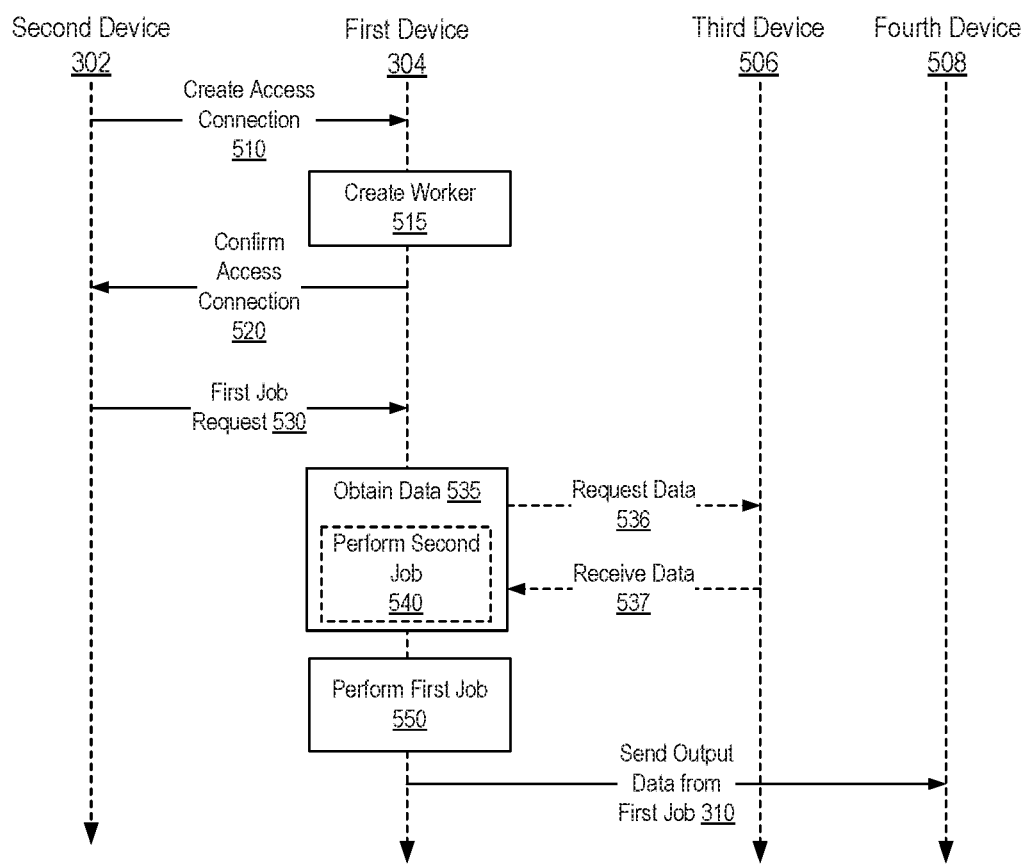
FIG. 5 is a diagram illustrating a messaging process flow between peer devices according an embodiment of the disclosure.

FIG. 5 is a diagram illustrating a messaging process flow between peer devices according an embodiment of the disclosure. As described, when communicating between peer devices, the framework may use a hierarchy of protocols. As shown, the example messaging flow may include a first device 302 (first type of device 302) and a second device 304 (second type of device 304) as shown in FIG. 3. In one embodiment, the second device 302 may send a create access connection message 510 to the first device 304 (e.g. host device). In response to receiving the create access connection message 510, the first device 304 may create a worker 515 (e.g. worker 320). In one embodiment, the create access connection message 510 may include the portable code for performing one or more jobs. In addition, the first device 304 may provide a confirm access connection message 520. In one embodiment, the create access connection message 510 and the confirm access connection message 520 message may conform to a first-level protocol (e.g. first-level protocol 350) and may include one or more predefined commands as further described herein. In addition, in one embodiment, the messages 510 and 520 may be managed by a daemon 310 on each respective device.

In one embodiment, once a worker (e.g. worker 320) is created, the first device 304 (or created worker) may receive messages conforming to the second-level protocol 355. This may include a first job request message 530 from the second device 304. The first job request message 530 may include one or more predefined set of messaging commands for the second-level protocol 355 as further described herein. In response to the first device 304 receiving the first job request 530, the first device 304 may obtain data 535 required to perform the first job. As further described herein, if the first device 304 has access to the data (e.g. stored within a data store of the first device 304), the first device may proceed to perform the first job 550. If the required data is not, for example, stored in the data store, the first device 304 may perform a second job (e.g. that is within a queue) to output the required data. In another example, the first device 304 may retrieve the data from a third device 506. For example, this may include sending a request for data message 536 to the third device 506. Accordingly, the first device 304 may receive the data 537 in a message provided by the third device 304 as part of the distributed computing system. Once the required data is obtained by the first device 304, the first device may perform the first job 550. In addition, as part of the distributed computing system, the first device 304 may then send the output data from the first job to another peer device (e.g. fourth device 508). For example, the fourth device 508 may require the data to perform a job as described above with respect to the first device 304.

As described, the messaging protocols (first-level protocol 350 and second-level protocol 355) may include a predefined set of messaging commands as shown in the example embodiments of FIGS. 6 and 7 and with reference to FIG. 5. FIG. 6 is a diagram illustrating an example structure for a first-level message 600 (e.g. daemon-level message) according an embodiment of the disclosure. For example, a first-level message 600 may include a command 610 followed by a payload 615. In some embodiments, the framework may also specify a size of the command (e.g. 32-bit integer). As shown, the commands may include a command to create a worker (e.g. CREATE), an indication that the create command failed (e.g. CREATE FAILED), a command to join a worker (e.g. JOIN), a confirmation of that the create or join command was successful (e.g. CREATE/JOIN OK), and an indication that a peer device is attempting to join an unknown worker (e.g. UNKNOWN WORKER).

For example, the create worker (e.g. CREATE) command may be included in the create worker message 510 which may instruct the first device 304 (or daemon 310) to create the worker 515. The payload of a create worker command may include portable code (e.g. LLVM IR) as described above. A device (e.g. first device 304) may analyze the code, and once the portable code is deemed safe, compile the portable code into an executable form. For example, the compiled code may include one or more functions to perform one or more computations for a job. In one embodiment, the set functions provided from the portable code may include a corresponding table or index of functions (e.g. func_table). For example, the table or index may be treated as a pointer to an array of function pointers corresponding to job entry points that may be invoked by the worker to perform a job. Once the portable code is successfully compiled, the daemon may assign an identifier (ID) to the created worker and return the ID as the payload in a confirmation message (e.g. CREATE/JOIN OK). For example, the confirmation may be sent in the confirm access connection 520 message sent to the second device 302. If the creation is not successful (e.g. the code was deemed unsafe), the device may respond with a command indicating such a failure (e.g. CREATE FAILED) accompanied by a reason code indicating the reason for the failure.

In addition, the commands may include join or connect to a worker command (e.g. JOIN) that allows another device to be added as a new connection to an existing worker. When a join command is received for a worker ID that is not recognized, the device (e.g. first device 304) may respond with an UNKNOWN WORKER command. Otherwise, the device may acknowledge the request with CREATE/JOIN OK command. After the device successfully handles a create or join command, the created worker may manage jobs and data received via the created access connection. For example, the worker may manage messages conforming to a second-level protocol 355 (e.g. worker-level protocol).

FIG. 7 is a diagram illustrating an example structure for a second-level message 650 (e.g. worker-level message) according an embodiment of the disclosure. For example, a second-level message 650 (e.g. worker-level message) may include a command 660 followed by a payload 665. As shown in this example, the worker-level commands may include a send data (e.g. PUSH), retrieve data (e.g. FETCH), a job request (e.g. JOB) a delete data (e.g. DELETE), and remove worker (e.g. DESTROY).

A send (e.g. PUSH) command may be included in the receive data message 537 and used to send data to another peer. For example, when a worker receives a send command, its payload may include a data ID k and a container x which are added to the data store $$D \leftarrow D \cup (k,x).$$

Accordingly, each element of the worker set W may then be examined to find the subset $W0 \subseteq W$ for which all dependencies are satisfied and then these are removed:

$$W \leftarrow W \setminus W0.$$

The now unblocked operations within W 0 are placed on their respective queues for execution.

A retrieve (e.g. FETCH) command may be included in the request data message 536 and may be described as the opposite of a send command (e.g. PUSH). For example, a worker issues a retrieve command with a data ID k to a peer requesting that it send the container x corresponding to k. Accordingly, when a message of this type is received, the worker first determines whether the container corresponding to the requested data ID is already stored in the data store (e.g. local data store of the device corresponding to the worker). If the container is already stored in the data store, it may provide a send message (e.g. PUSH) back to the requesting peer by scheduling it for sending via the serial send queue. If the requested data ID is not already stored in the data store, the waiter set may be updated. For example the updated waiter set may be represented as $$W \leftarrow W \cup (\{k\}, qs, \text{send}(p, k, \cdot))$$

where p is the connection to the peer requesting the data and send(p, k, x) is a function that provides the send message with payload (k,x) that may be sent over connection p.

A job request command (e.g. JOB) may be sent to a peer to request that it perform some work. For example, the job request command may be included in the first job request message 530 as shown in FIG. 5. In one embodiment, the payload of a job message may describe the connectivity of a job node within the abstract computational graph as described above with respect to FIGS. 1A and 1B. In one embodiment, the payload may include: a list of input data IDs $K_{in}$, that the job requires as prerequisites; a list of data IDs $K_{out}$ that will be generated when the job completes execution; and a function index j, which may be an index into the index (e.g. func_table) array of entry points obtained from the portable code. For example, the entry points may correspond to the functions provided from the compile portable code to perform a computation for a job.

As with retrieving data, when receiving a job request, the worker may first check to see if the input dependencies are already satisfied and, if so, may schedule an entry point for execution on the concurrent work queue. If the job is blocked, it may be added as a waiter:

$$W \leftarrow W \cup (Ki_n, qw, \text{func\_table}[j]).$$

In one implementation, items on the work queue may execute concurrently. This concurrent execution may be provided in an efficient manner due to the system insuring a level of purity in job implementations. This allows for job execution to remain agnostic with respect to one another which may be concurrently executing. Accordingly, when a job completes, it may produce data to be stored in one or more output containers. Thus, the system may add these to the data store and unblock any waiters that are awaiting such data. Accordingly, send data commands may be invoked via the receive queue, as if the newly-created containers that were received over the network. Accordingly, in one embodiment, the framework may allow only the serial receive queue to manipulate the state of a worker.

A delete data (e.g. DELETE) command may instruct a worker to delete data with the specified ID k' from its data store $$D \leftarrow \{(k,x) \in D | k' = k'\}.$$

If the data is not in the data store at the time the message is received, the command does nothing. It should be noted that the DELETE command does not necessarily get queued as a waiter.

A remove worker (e.g. DESTROY) command may be provided to a worker when it is no longer required along with its associated data. Accordingly, this command may be used when the system would like to release the resources the worker is occupying on the host device. This may be characterized as a graceful exit as the waiter waits until the waiter set is empty, and all scheduled operations on the send and work queues have completed. Accordingly, in one implementation, once a destroy command has been issued, no future PUSH or JOB commands may be accepted.

It should be noted the command names as described above are examples and other command names with equivalent functions (e.g. "create" command equivalent to "new" command, or the like) are also contemplated within embodiments.

As discussed above with respect to FIG. 4, a worker (e.g. worker 320) may maintain state information 330, which may be stored as state (D, W). The state may include a data store D (e.g. data store 340) and a waiter set W (e.g. waiter set 345). In one embodiment, the data store may be an associative array that maps data IDs to containers. Accordingly, when data is received over the network, or is produced by a job performed by the host, it may be stored in the data store. In one implementation, the data store may be modelled as a set of key (id k) value (container x) pairs $$D = \{(k_1, x_1), \ldots, (k_n, x_n)\}.$$

The waiter set may include operations (e.g. computations) which the worker cannot perform until one or more containers are available. This may include job nodes and requests for data made by other peers. Accordingly, in one implementation, this may be modelled as a set of waiters $$W = \{w_1, \ldots, w_m\}.$$

In one implementation, a waiter $w_i$ may be a triple including a set of input dependencies, a dependent operation, and an execution queue on which to perform the operation once the dependencies are satisfied. For example, a job that requires containers $x_a$, $x_b$, and $x_c$ before it can execute, can be a waiter represented as $$w = (\{k_a, k_b, k_c\}, q, f)$$

where $k_{a,b,c}$ are the data IDs corresponding to the three inputs, and $f(\cdot,\cdot,\cdot)$ is a function which may perform the required job when provided with the appropriate containers, and q is the execution queue on which to compute $f(x_a, x_b, x_c)$.

In one embodiment, a worker may be associated with three execution queues, which may include a serial receive queue qr; a serial send queue qs; and a concurrent work queue qw. In one embodiment, one or more of the execution queues may be implemented as a dispatch queue (e.g. libdispatch queue), which may be an object structure that manages submitted tasks (e.g. jobs). In one implementation, a dispatch queue may be a first-in, first-out data structure, and accordingly, submitted tasks may be performed in the same order in which they were added to the queue. In one embodiment, the dispatch queues may execute arbitrary blocks of code either asynchronously or synchronously with respect to the caller (e.g. worker). For example, dispatch queues may be used to perform tasks that may be typically be performed on separate threads. For instance, in some implementations, one advantage of a dispatch queue is that they may be simpler to manage or more efficient at executing tasks than corresponding threaded code.

As described above, incoming messages may be handled in the order in which they are received by the serial receive queue. Accordingly, the worker may update the state (D, W), and perform operations with these messages using the commands as described below.

As described above, data nodes contain information that may be required for a job. The data may be structured in any suitable format. In some embodiments, a data node may be implemented as a container, which encapsulates the information required to execute a job. A single container may include all of the data required by a job, or it the data may be split across several containers. Accordingly, a data node may have a unique identifier and a corresponding container. In addition, a peer that knows the identifier for a data node, but does not have a corresponding container stored locally, may have a placeholder (or future) on its value. Accordingly, the data may be referred to when assembling a computation and jobs can continue to progress until the materialized container is necessary. Accordingly, the configurations described above may mitigate the effects of latency between peers in the system, and once a container exists, it may be replicated (e.g. temporarily) to other peers.

As described, data may be distributed within the system using a container structure. In one embodiment, the container structure may include a body and zero or more extents as further described herein. The body may act as the root object and may be a contiguous array of memory with known length. The body may store primitive data types (or aggregates thereof). In one embodiment, the implementation of the container structure may account for programming languages that make extensive use of pointers (e.g. C-style programming languages). While a pointer may be meaningful in the context of a particular program, it typically does not include semantics when used by the runtime. For example, it may not be known whether a pointer points to one item or an array, or how the object referenced by the pointer was allocated, or whether the object reference is safe to execute, modify, etc. A container may be transferred between peers, and therefore, it may be necessary that the data within it can be serialized and have well-defined ownership. Due to the deficiencies with bare pointers, in one embodiment, any pointers appearing within the body of a container may correspond to an extent and have an associated extent record. For example, an extent record may provide the missing semantics for a bare pointer. The types of extents may be provided based on a particular use case. For example, an extent type may include dispatch blobs and objects. A dispatch blob may be a managed data object used in a dispatch (e.g. libdispatch). These may be reference-counted objects, the underlying management of which may be performed by a libdispatch runtime. An object (e.g. objective-C objects) may be managed by a runtime (e.g. Objective-C runtime) and may also be reference-counted. Typically, the size in memory of these extents is unknown to the system, but it may also be determined using an implementation of a protocol that declares, for example, that instances of a class can be encoded and decoded (e.g.

NSCoding). Accordingly, this allows for the class to serialize and deserialize these extents.

In one embodiment, a container may be stored as a contiguous block of memory that includes a header describing the size and ownership of the container. This may be followed by the body and then the extent records. For example, using a C-style programming language, the header may have the following format:

```
typedef struct {
    uint64_t body_size;
    uint64_t extent_count;
    void (*destructor) (void*);  char   body[ ];
} octopus_header_t;
```

Accordingly, body_size may correspond to the length of the body of the container in bytes; extent_count may correspond to the number of extent records, and therefore, the number of pointers appearing in the body, and destructor may correspond to a function pointer informing the system on how to destroy the container upon completion. In addition, the flexible array body at the end of the header may contain the flat body array and the extent table. The body array may be untyped at the runtime level, but the extent records may conform to the following C-style programming language type:

```
typedef struct {
      unsigned long offset : 56;
      unsigned char type : 6;
} octopus_extent_t;
enum { EXTENT_TYPE_BLOB=1, EXTENT_TYPE_OBJC=2 };
``` where offset may indicates where the corresponding pointer is located, and measured in bytes from the start of the body array.

As an example, shown below is the Objective-C struct type Foo:

```
struct Bar {
    int-32_t       val;
    NSString*      name;
};
struct Foo {
    uint64_t            x;
    float               y[6];
    dispatch_data_t     blob;
    struct              Bar z;
};
```

Figure 8:
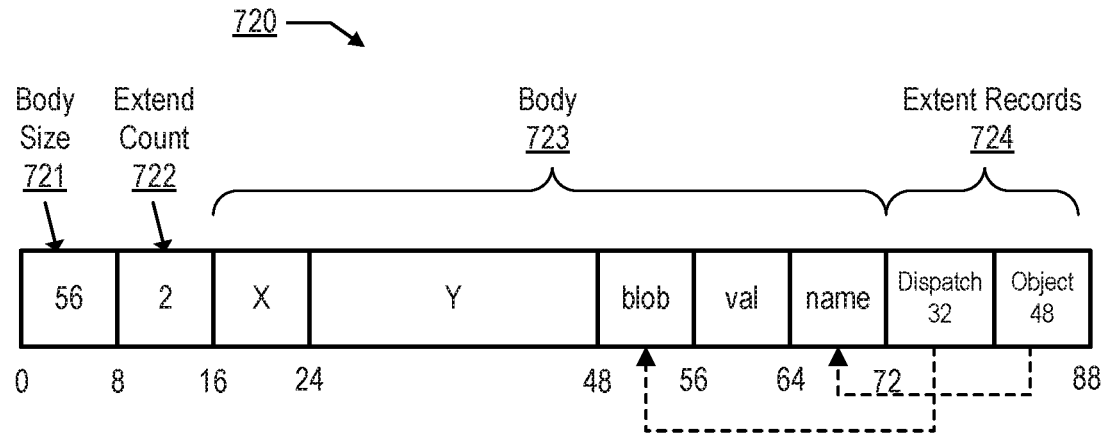
FIG. 8 is a diagram illustrating an example data container according an embodiment of the disclosure.

FIG. 8 is a diagram illustrating an example data container according an embodiment of the disclosure. The container may include a body size 721, an extend count 722, a body 723, and extent records 724. As shown in this example, the figure shows how data of type Foo would be structured in a data container 720 according to one embodiment of the disclosure. Accordingly, the member Foo.blob may correspond to a libdispatch blob (e.g. dispatch_data_t is typedefed as a pointer to the opaque type struct dispatch_data_s), and Foo.bar.name may correspond to a pointer to an Objective-C object of type NSString. Thus, both of these pointers may require extent records. As shown in this example, the container layout for the type Foo may be constructed from a contiguous body array. Accordingly, any pointers that appear within the body may refer to disjoint regions in memory and may have an accompanying extent record describing the characteristics a corresponding object.

Figure 9:
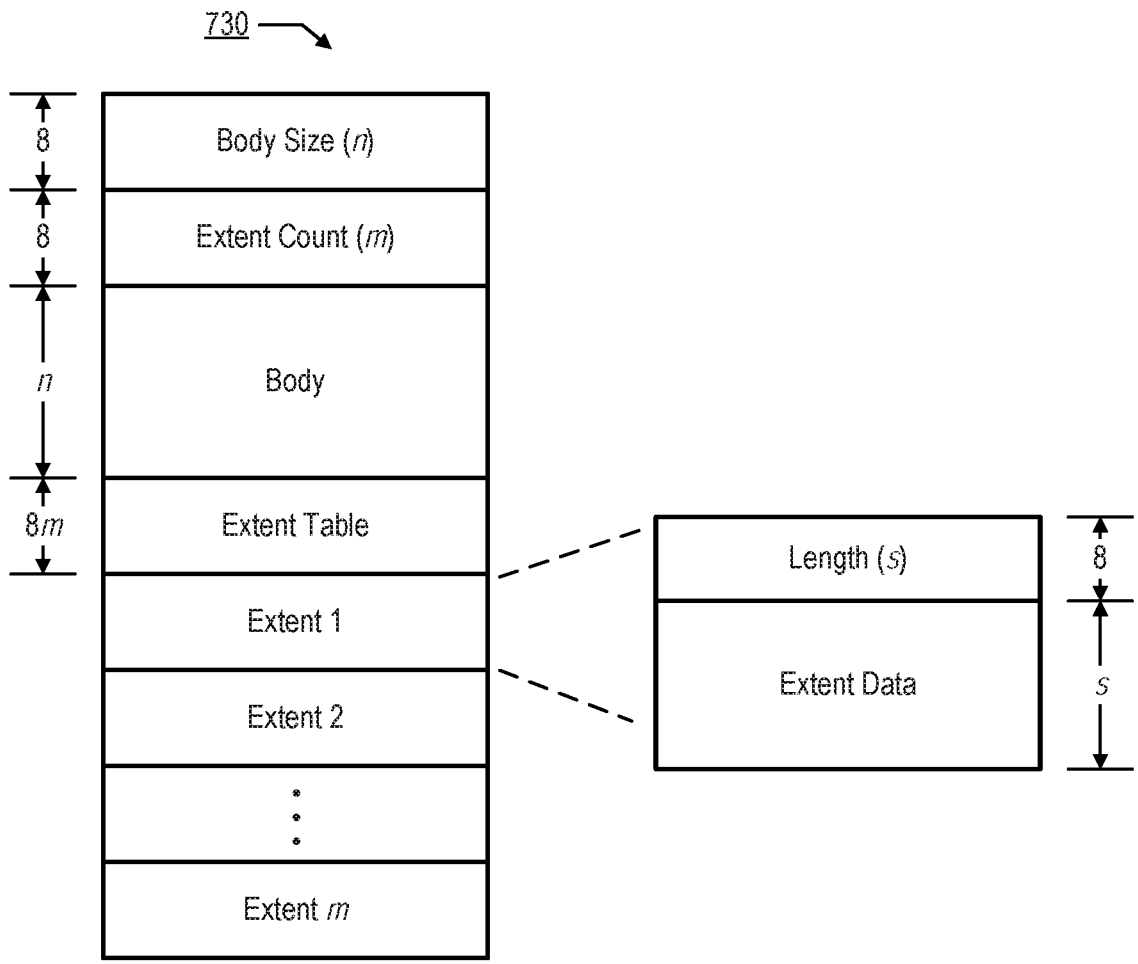
FIG. 9 is a diagram illustrating an example of linearized data within a data container according an embodiment of the disclosure.

FIG. 9 is a diagram illustrating an example of linearized data within a data container (e.g. container 720) according an embodiment of the disclosure. In one implementation, the system may perform a serialization of writing a container to a stream-like device, such as a file or network connection. Due to the restrictions on what may be stored in containers, their serialization may be efficiently implemented by the system. For example, a header, body, and extent table of the container may be a contiguous array of memory 730, and thus, already in a serialized state. In addition, if there are any extents, these may be stored in disparate memory locations, and accordingly, may need to be converted into a flat array and appended to the body. This may be done according to the type of an extent.

As described above, a job node in the system may transform zero or more data nodes into one or more other data nodes. Accordingly, input prerequisites for a job may be computed before the job node can be executed.

In one implementation, the system may have increased flexibility to optimize execution if the job nodes represent pure functions. For example, this may include that the outputs of a job may only be dependent on its inputs (e.g. no side-effects). For example, in the standard C library, the function float sin(float x)

is pure because its return value is dependent only on the value of x. On the other hand, void* malloc(size_t size)

is not pure because its return value depends not only on the value of size, but also on the memory status of the underlying platform. It also has side-effects due to the fact that if the allocation succeeds, the heap will be different after the call.

Typically, pure jobs provide referential transparency that enable exchange of the output of a computation for a description of the computation together with its input values. As mentioned above, data nodes may use a named, but a not-materialized, data node as a placeholder. This is possible due to referential transparency (e.g. a client can use a description of a computation in place of its output value).

As described, a job may perform work within the system. In one embodiment, a job may have a single function as its entry point that accepts two arguments. For example, in a C-style programming language implementation, a job may include entry point as follows

```
typedef void (octopus_job_func*)(
      const octopus_header_t**    inputs,
      octopus_header_t**          outputs
);
```

In this example, the first argument is an array of data containers representing the n ordered inputs to the job node. In this example, these are to be treated as constants and may not be modified by the job. The second argument is an array of m empty containers. This may be the destination for the outputs, which are intended to be overwritten. The cardinalities m and n may be implicit. In other words, the system may assume that these are statically known to the job implementer. As an example, consider a function which averages the byte values in two arrays

```
dispatch_data_t blend(dispatch_data_t im1,
      dispatch_data_t im2)
```

This takes two libdispatch blobs as inputs, containing byte arrays of the same length, and returns a blob containing the average of the two inputs. When the system performs this operation, the system may first determine the topology of the job. While it may be determined that the job has exactly one output, the system may need to determine how many inputs are required. As described above, a data container can hold more than one value. Accordingly, there may be a single input container, which contains both im1 and im2, or these could be split into two inputs.

Figure 10:
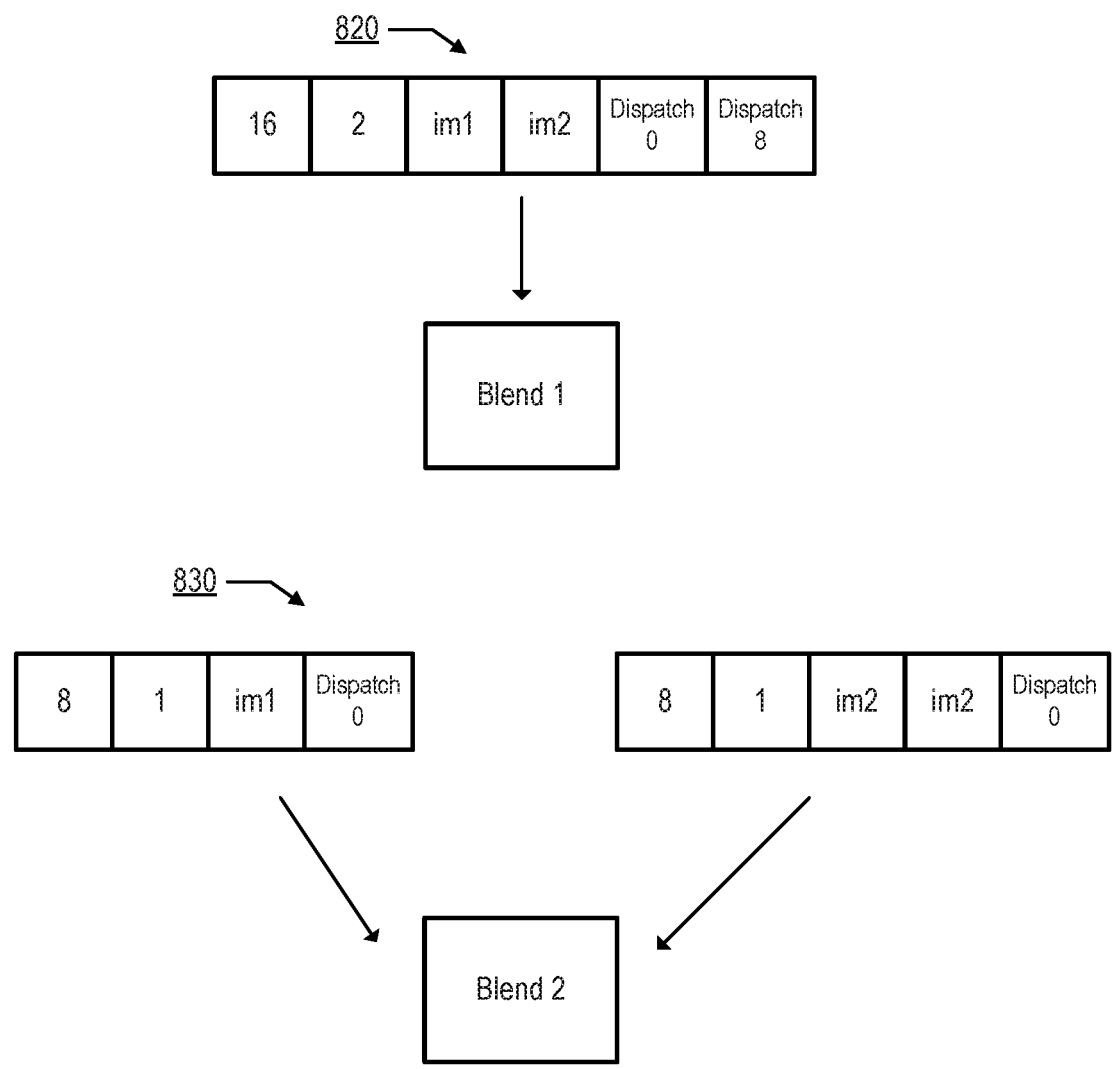
FIG. 10 is a diagram illustrating an example of a blend function using one or two containers according an embodiment of the disclosure.

FIG. 10 is a diagram illustrating an example of blend function using one or two containers according an embodiment of the disclosure. As shown, the topologies may include the use of one container 820, or two (or more) containers 830. The choice of job topologies may be determined by a higher-lever application. For example, if there are two inputs, there is more flexibility as to where and when the input objects can be produced at the cost of a more complex computational graph to manage. By way of example, if the second job topology is selected (e.g. 830), in which the job has two input objects; the following code is an example configuration of a blend provided inside a job entry point.

```
void blend_job(
     const octopus_header_t** inputs,
     octopus_header_t**      outputs)
{
// Extract input data
dispatch_data_t im1 = (dispatch_data_t)inputs[0]->body;
dispatch_data_t im2 = (dispatch_data_t)inputs[1]->body;
// Call blend function
dispatch_data_t result = blend(im1, im2);
// Get the size of the output container
const size_t len =
       sizeof(octopus_header_t) +
       sizeof(result) +
       sizeof(octopus_extent_t[1]);
// Get pointers to header, body, and extent table
octopus_header_t* output   = malloc(len);
dispatch_data_t* body      = (dispatch_data_t*)output->body;
octopus_extent_t* extent   = (octopus_extent_t*) (body + 1);
// Fill-in the required information
output->body_size      = sizeof(result);
output->extent_count   = 1;
output->destructor     = free;
*body                  = result;
extent->type           = EXTENT_TYPE_BLOB;
extent->offset         = 0;
outputs[0] = output;
}
```

It should be noted that the example code above is illustrative of design, for example, of a runtime of the system. However, other implementations are also contemplated.

Figure 11:
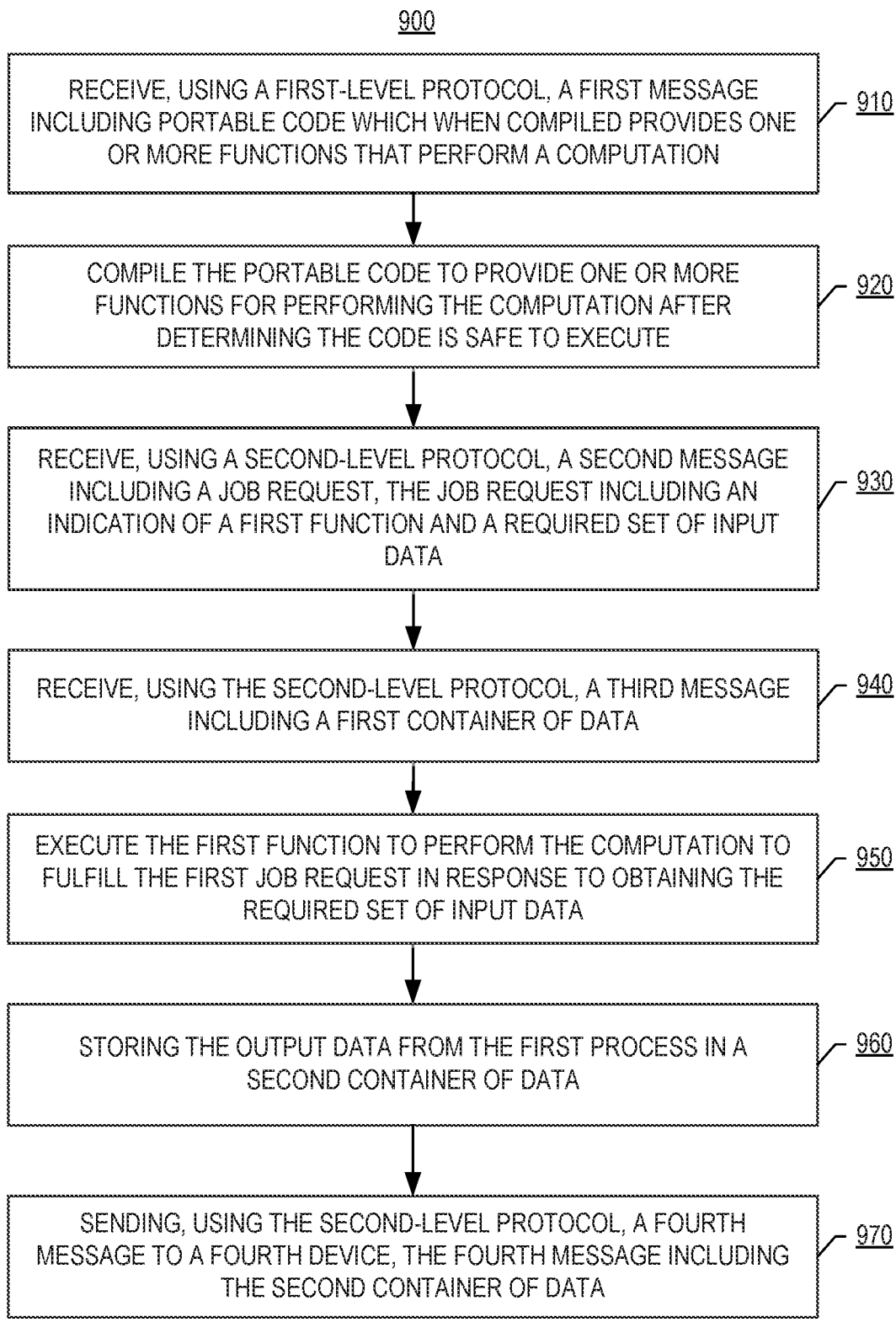
FIG. 11 is a flow diagram of a method of performing a process in response to obtaining a required set of input data according to an embodiment of the disclosure.

FIG. 11 is a flow diagram of a method of performing a process in response to obtaining a required set of input data according to an embodiment of the disclosure. Process 900 may use processing logic, which may include software, hardware, or a combination thereof. For example, process 900 may be performed by a system (or device 110). In 910, a first device (e.g. device 304) may receive, using a first-level protocol (e.g. first-level protocol 350), a first message from a second device (e.g. device 302). The first message may include portable code which when compiled provides one or more functions that perform a computation by the first device within a distributed computing system. In 920, the first device may compile the portable code to provide the one or more functions for a job after determining the portable code is safe to execute on the first device. In 930, the first device may receive, using a second-level protocol (e.g. second-level protocol 350), a second message from the second device, the second message including a first job request. The first job request may include an indication of a first function to be performed by the first device, and an indication of a required set of input data to perform the first function. In 940, the first device may also receive, using the second-level protocol, a third message from a third device (e.g. device 506). The third message may include a first container of data and the first device may store the data in a data store of the first device. In 950, the first device may execute the first function to perform the computation to fulfill the first job request in response to the first device obtaining the required set of input data. In one embodiment, obtaining the required set of input data may include determining the required set of input data is stored in the data store of the first device, and retrieving the required set of input data from the data store. In addition, in one embodiment, obtaining the required set of input data may include determining at least a portion of the required set of input data is not stored in a data store of the first device, and in response, retrieving the portion of the required set of input data not stored in a data store from a third device.

In 960, the first device may store the output from the first process in a second container of data. Accordingly, in 970, the first device may send a fourth message including the second container to a fourth device (e.g. device 508).

Figure 12:
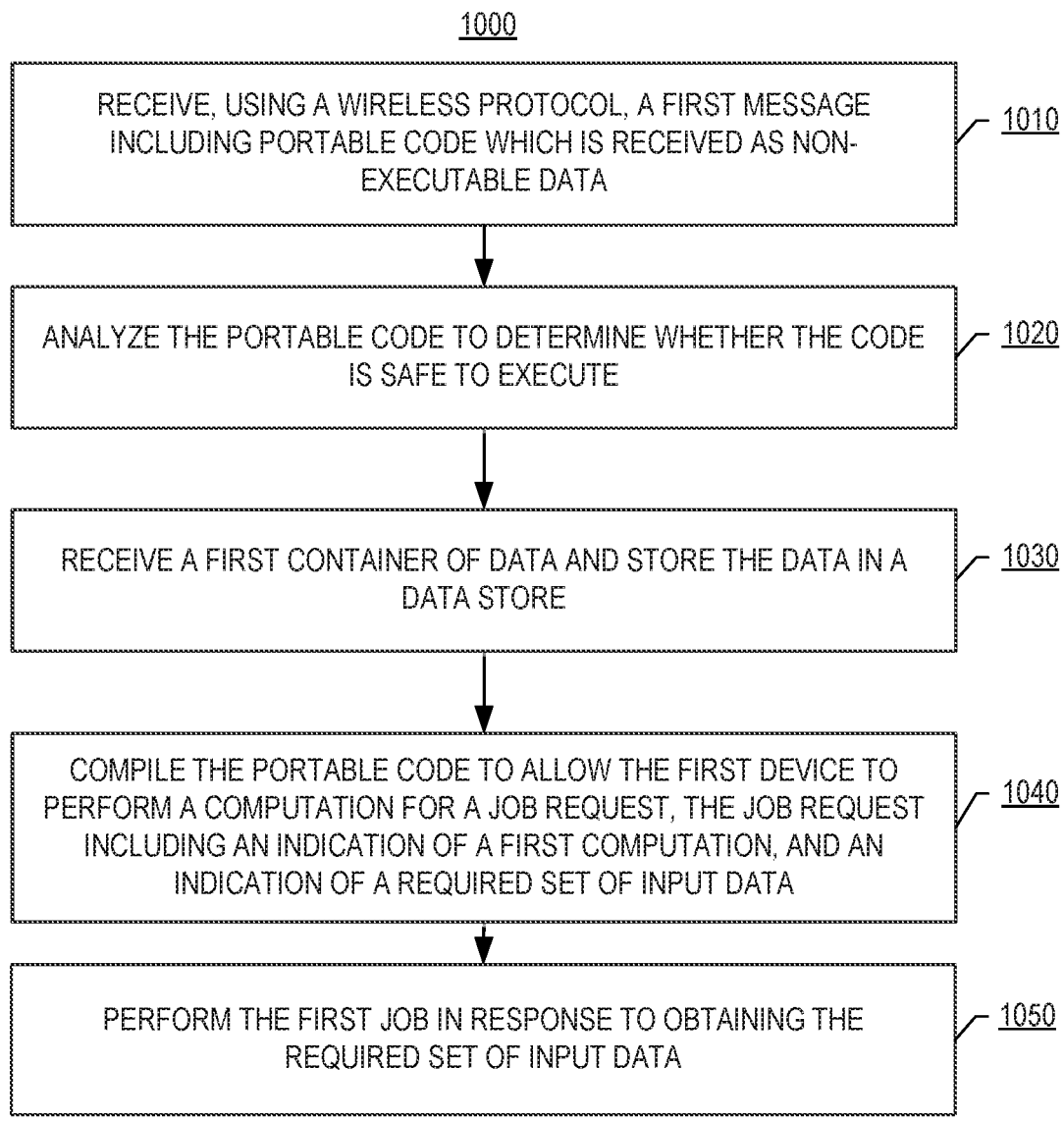
FIG. 12 is a flow diagram of a method of analyzing and compiling portable code according to an embodiment of the disclosure.

FIG. 12 is a flow diagram of a method of analyzing and compiling portable code according to an embodiment of the disclosure. Process 1000 may use processing logic which may include software, hardware, or a combination thereof. For example, process 1000 may be performed by a system (or device 110). In 1010, a first device may receive, using a wireless protocol. The first message may include portable code which is received as non-executable data and when executed allows the first device to share resources within a distributed computing system with one or more other devices including a second device. In 1020, the first device may analyze the portable code to determine whether it is safe to compile and execute. In one embodiment, the analyzing may include a check of control flow integrity for the portable code. In 1030, the first device may receive a first container of data and store the data in a data store. In 1040, the first device may compile the portable code to allow the first device to perform a one or more computations for a job request. The job request may include an indication of a first computation, and an indication of a required set of input data. Accordingly, in 1050, the first device may perform the first computation in response to obtaining the required set of input data.

Figure 13:
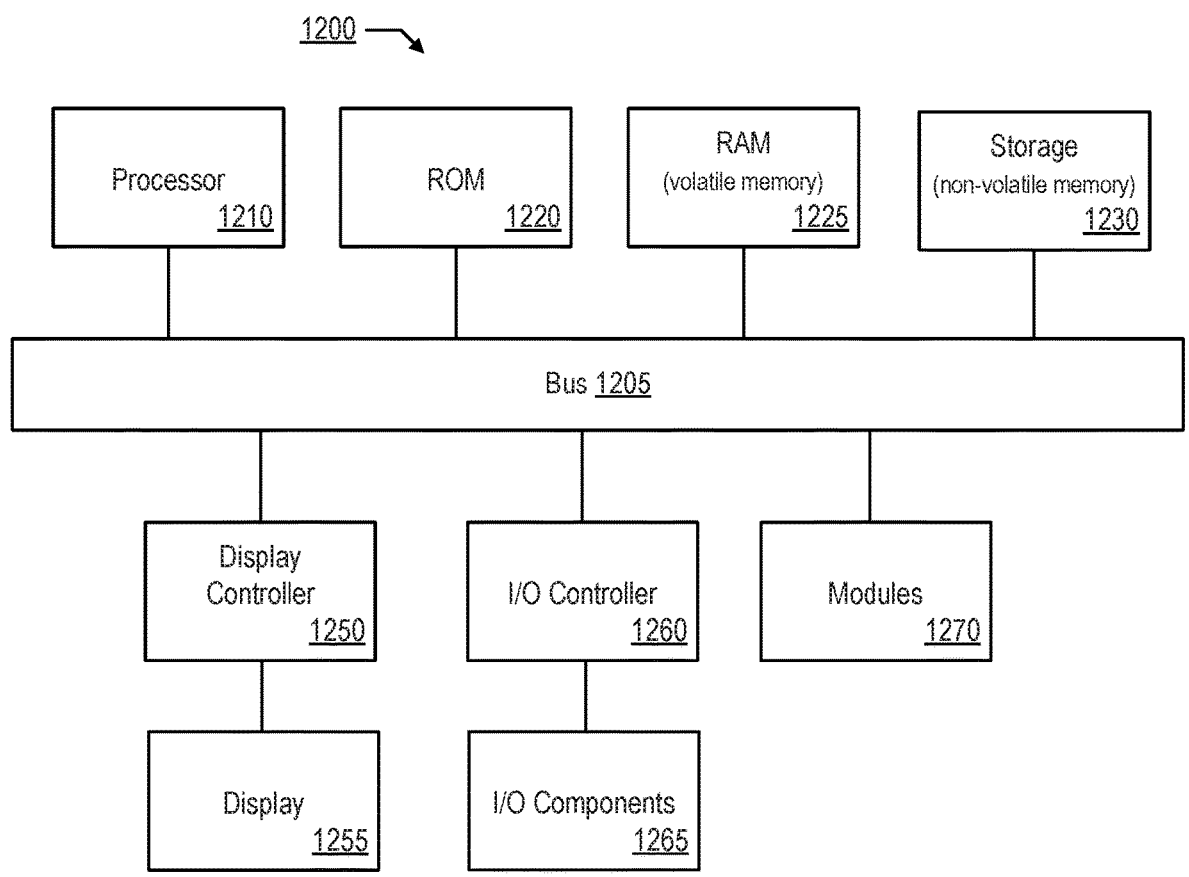
FIG. 13 is a block diagram illustrating an example computing system, which may be used in conjunction with one or more of the embodiments of the disclosure.

FIG. 13 is a block diagram illustrating an example computing system, which may be used in conjunction with one or more of the embodiments of the disclosure. For example, computing system 1200 (or system, or computing device, or device) may represent any of the systems, or devices described herein (e.g. device 110) that perform any of the processes, operations, or methods of the disclosure. Note that while the computing system illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 1200 may include a bus 1205 which may be coupled to a processor 1210, ROM (Read Only Memory) 1220, RAM (or volatile memory) 1225, and storage (or non-volatile memory) 1230. The processor 1210 may retrieve stored instructions from one or more of the memories 1220, 1225, and 1230 and execute the instructions to perform processes, operations, or methods described herein. These memories represent examples of a non-transitory machine-readable medium (or non-transitory computer-readable medium, or storage) containing instructions which when executed by a computing system (or a processor), cause the computing system (or processor) to perform operations, processes, or methods described herein. The RAM 1225 may be implemented as, for example, dynamic RAM (DRAM), or other types of memory that require power continually in order to refresh or maintain the data in the memory. Storage 1230 may include, for example, magnetic, semiconductor, tape, optical, removable, non-removable, and other types of storage that maintain data even after power is removed from the system. It should be appreciated that storage 1230 may be remote from the system (e.g. accessible via a network).

A display controller 1250 may be coupled to the bus 1205 in order to receive display data to be displayed on a display device 1255, which can display any one of the user interface features or embodiments described herein and may be a local or a remote display device. The computing system 1200 may also include one or more input/output (I/O) components 1265 including mice, keyboards, touch screen, network interfaces, printers, speakers, and other devices. Typically, the input/output components 1265 are coupled to the system through an input/output controller 1260.

Modules 1270 (or components, units, or logic) may represent any of the components (e.g. daemon 310 or worker 320) described herein. Modules 1270 may reside, completely or at least partially, within the memories described above, or within a processor during execution thereof by the computing system. In addition, modules 1270 can be implemented as software, firmware, or functional circuitry within the computing system, or as combinations thereof.

It should be noted that there may be variations to the flow diagrams or the steps (or operations) described therein without departing from the embodiments described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the embodiments described herein. For instance, components may be added, omitted, and may interact in various ways known to an ordinary person skilled in the art. Terms such as first, second, etc. may be used herein to describe various elements, and these elements should not be limited by these terms. These terms may be used distinguish one element from another. For example, a first device may be termed a second device, and, similarly, a second device may be termed a first device.

In the foregoing specification, example embodiments of the disclosure have been described. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A non-transitory machine-readable medium storing instructions which, when executed by one or more processors of a computing device, cause the computing device to perform operations comprising:

receiving, using a first-level protocol and by a daemon process on a first device, a first message from a second device, the first message including portable code which when compiled provides one or more functions to perform a computation by the first device within a distributed computing system, wherein the first-level protocol includes a first-level command messaging protocol;

receiving, using a second-level protocol and by a worker process created by the daemon process that is separate from the daemon process, a second message from the second device, the second message including a first job request, wherein the first job request includes an indication of a first function of the one or more functions, and an indication of a required set of input data to perform the first function, wherein the second-level protocol includes a second-level command messaging protocol different from the first-level command messaging protocol, wherein the worker process manages messages of the second-level protocol including the second message different from messages of the first-level protocol, wherein the worker process is instantiated by the daemon process;

in response to receiving the second message by the worker process, compiling a portion of the portable code corresponding to the first function without compiling the rest of the portable code that includes a third function; and in response to the first device obtaining the required set of input data, the first device executing the first function to perform the computation to fulfill the first job request, wherein the portion of the portable code is compiled in response to determining the portable code is safe to execute on the first device, and wherein the portable code is LLVM IR (low level virtual machine intermediate representation), and the first device and the second device are different types of devices and each operate using a different operating system.

2. The medium of claim 1, the operations further comprising in response to receiving the first job request, JIT (just-in-time) compiling the portion of the portable code corresponding to the first function.

3. The medium of claim 1, wherein the first message includes an index for the one or more functions, and the indication of the first function of the first job request includes a value within the index corresponding to the first function.

4. The medium of claim 1, wherein the second device selects the first device to perform the first job request based on one or more characteristics of the first device, wherein the one or more characteristics include a processing capability and a current power source for the first device.

5. The medium of claim 1, the operations further comprising receiving, using the second-level protocol and at the first device, a third message from a third device, the third message including a first container of data, and storing the data in a data store of the first device.

6. The medium of claim 5, wherein obtaining the required set of input data comprises
   determining the required set of input data is stored in the data store of the first device, and
   retrieving the required set of input data from the data store.

7. The medium of claim 6, wherein the first job request further includes a reference to a second container of data to store output data from the first function, and wherein the operations further comprise:
   storing the output data from the executed first function in the second container of data; and
   sending, using the second-level protocol, a fourth message to a fourth device, the fourth message including the second container of data.

8. The medium of claim 1, wherein obtaining the required set of input data comprises
   determining at least a portion of the required set of input data is not stored in a data store of the first device, and
   in response, retrieving the portion of the required set of input data not stored in a data store from a third device.

9. The medium of claim 8, wherein retrieving the portion of the required set of input data comprises
   sending, using the second-level protocol and from the first device, a third message to the third device, the third message including a request for a first container of data, the request including one or more references identifying the portion of the required set of input data, and
   receiving, using the second-level protocol and at the first device, a fourth message from the third device, the fourth message including the first container of data including the portion of the required set of input data.

10. The medium of claim 1, wherein obtaining the required set of input data comprises
    determining at least a portion of the required set of input data is not stored in a data store of the first device, and
    in response, executing a second function of the one or more functions to perform the computation for a second job within a job queue of the first device, wherein the executed second function outputs the portion of the required set of input data.

11. The medium of claim 1, wherein the first-level protocol includes at least a first command to create the worker process, and a second command allowing another device within the distributed computing system to connect to the worker process.

12. The medium of claim 1, wherein the second-level protocol includes at least a first command to send a container of data to another device within the distributed computing system, and a second command to retrieve a container of data from another device within the distributed computing system.

13. The medium of claim 1, wherein the container to store the set of outputs is an array of containers.

14. A first device, comprising:
    a memory storing instructions; and
    a processor coupled to the memory to execute the instructions from the memory, the processor being configured to:
    receive, using a first-level protocol, a first message from a second device, the first message including portable code which when compiled provides one or more functions to perform a computation by the first device within a distributed computing system, wherein the first-level protocol includes a first-level command messaging protocol;
    receive, using a second-level protocol, a second message from the second device, the second message including a first job request, wherein the first job request includes an indication of a first function of the one or more functions, an indication of a required set of input data to perform the first function, and a reference to a first container of data to store output data from the first function, wherein the second-level protocol includes a second-level command messaging protocol different from the first-level command messaging protocol, wherein a daemon process manages messages of the first-level protocol and a worker process that is separate from a daemon process manages messages of the second-level protocol different from messages of the first-level protocol, wherein the worker process is instantiated by the daemon process;
    in response to receiving the second message by the worker process, compile a portion of the portable code corresponding to the first function without compiling the rest of the portable code that includes a third function to create the first function after determining the portable code is safe to execute on the first device; and
    in response to the first device obtaining the required set of input data, the first device executing the first function to perform the computation to fulfill the first job request,
    wherein the portion of the portable code is compiled in response to determining the portable code is safe to execute on the first device, and
    wherein the portable code is LLVM IR (low level virtual machine intermediate representation), and the first device and the second device are different types of devices and each operate using a different operating system.

15. The device of claim 14, wherein the first-level protocol comprises a daemon-level protocol and the second-level protocol comprises a worker-level protocol.

16. The device of claim 14, wherein the processor is further configured to:
    store the output data from the first job performed by the first device in the first container of data; and
    send the first container of data to a third device.

17. A computer-implemented method, comprising:
    receiving, using a wireless protocol and on a first device, a first message including portable code which is received as non-executable data and when executed allows the first device to share resources within a distributed computing system with one or more other devices including a second device;
    analyzing, on the first device, the portable code to determine whether the portable code is safe from intrusion and execution on the first device;
    receiving, at the first device, a first container of data, and storing the data in a data store of the first device;
    compiling, at the first device, the portable code to allow the first device to perform a one or more computations for a job request, wherein the job request includes an indication of a first computation to be performed by the first device, and an indication of a required set of input data, in the first container of data, to perform the first computation;
    wherein compiling the portable code comprises compiling a portion of the portable code corresponding to a first function without compiling the rest of the portable code that includes a third function in response to receiving a second message, wherein a daemon process manages messages of a first-level protocol including a first message and a worker process manages messages of a second-level protocol including a second message different from messages of the first-level protocol, wherein the worker process is instantiated by the daemon process; and in response to the first device obtaining the required set of input data, performing the first computation for the first job by the first device, wherein the portion of the portable code is compiled in response to determining the portable code is safe to execute on the first device, and wherein the portable code is LLVM IR (low level virtual machine intermediate representation), and the first device and the second device are different types of devices and each operate using a different operating system.

18. The method of claim 17, wherein the analyzing includes a check of control flow integrity, and the first device creates a second container of data to store output data from the first job, and wherein the method further comprises:

storing the output data from the first job performed by the first device in the second container of data; and sending the second container of data to the second device.

* * * * *